United States Patent
Beheydt et al.

(10) Patent No.: US 9,226,008 B2
(45) Date of Patent: Dec. 29, 2015

(54) REMOTE RE-MULTIPLEXING WITH PACKET INCLUSION

(71) Applicant: Cisco Technology, Inc., San Jose, CA (US)

(72) Inventors: Samie Beheydt, Geluwe (BE); Joachim M. Vanhaecke, Assebroek (BE)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 13/969,897

(22) Filed: Aug. 19, 2013

(65) Prior Publication Data

US 2013/0329752 A1    Dec. 12, 2013

Related U.S. Application Data

(63) Continuation of application No. 12/685,128, filed on Jan. 11, 2010, now Pat. No. 8,514,853.

(51) Int. Cl.
 *H04L 12/28* (2006.01)
 *H04N 21/236* (2011.01)
 *H04N 21/434* (2011.01)
 *H04H 20/67* (2008.01)

(52) U.S. Cl.
 CPC ..... *H04N 21/23608* (2013.01); *H04N 21/4344* (2013.01); *H04H 20/67* (2013.01)

(58) Field of Classification Search
 CPC .............................. H04N 21/23608
 USPC ........................................ 370/389
 See application file for complete search history.

(56) References Cited

U.S. PATENT DOCUMENTS

| | | | |
|---|---|---|---|
| 7,185,352 B2 | 2/2007 | Hallford et al. | |
| 8,514,853 B2 | 8/2013 | Beheydt et al. | |
| 2001/0009548 A1 | 7/2001 | Morris | |
| 2003/0128775 A1* | 7/2003 | Wu et al. | 375/316 |
| 2008/0310453 A1 | 12/2008 | Bargauan | |
| 2009/0175356 A1* | 7/2009 | Hagemeier et al. | 375/240.26 |
| 2010/0102869 A1* | 4/2010 | Stoler et al. | 327/298 |
| 2011/0170539 A1 | 7/2011 | Beheydt et al. | |

FOREIGN PATENT DOCUMENTS

WO    WO 2009/000982 A2    12/2008

OTHER PUBLICATIONS

DVB-H Mobile TV flexible satellite distribution, UDcast Full IP over Broadcast Media, Jan. 2007, 16 pages.
International Search Report and Written Opinion mailed Mar. 9, 2011 in PCT/US2011/020386.
European Communication dated Aug. 13, 2013 in Application No. 11 700 875.5, 3 pages.

* cited by examiner

*Primary Examiner* — Wei Zhao
(74) *Attorney, Agent, or Firm* — Merchant & Gould

(57) ABSTRACT

In one system embodiment, a master re-multiplexer may be configured to receive an indexed transport stream, re-multiplex the indexed transport stream by performing a set of re-multiplexing operations, generate a helper transport stream, the helper transport stream comprising a description of the set of operations, wherein the set of operations comprises both program clock reference (PCR) re-stamping and inserting packets, and providing the helper transport stream over a communications network to plural remote re-multiplexers capable of identically re-multiplexing the indexed transport stream based on the helper transport stream.

17 Claims, 9 Drawing Sheets

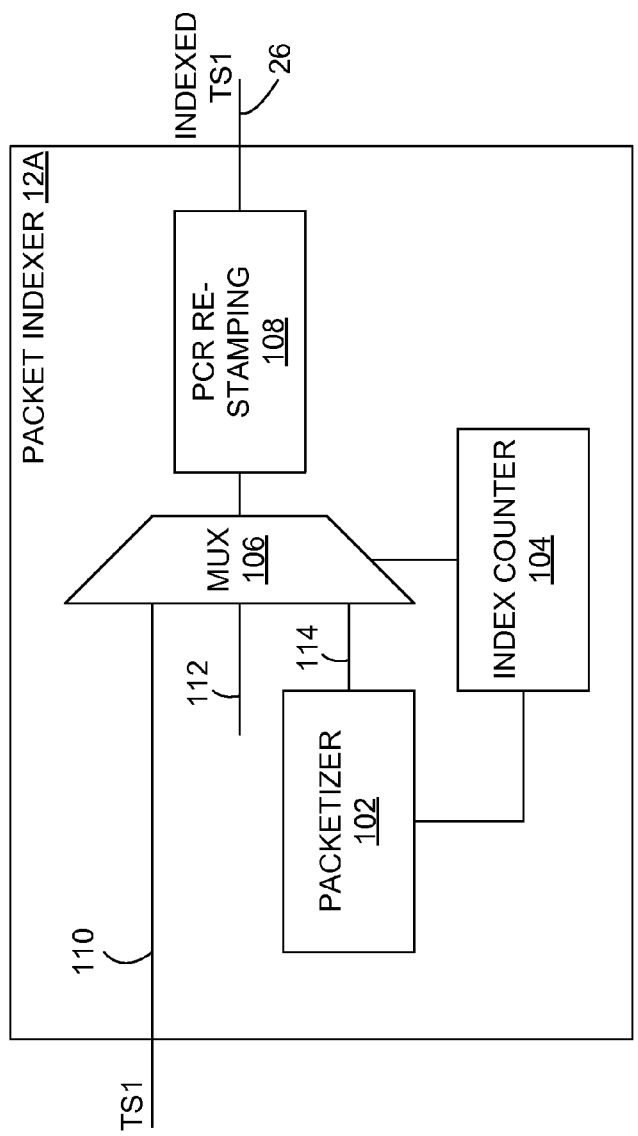
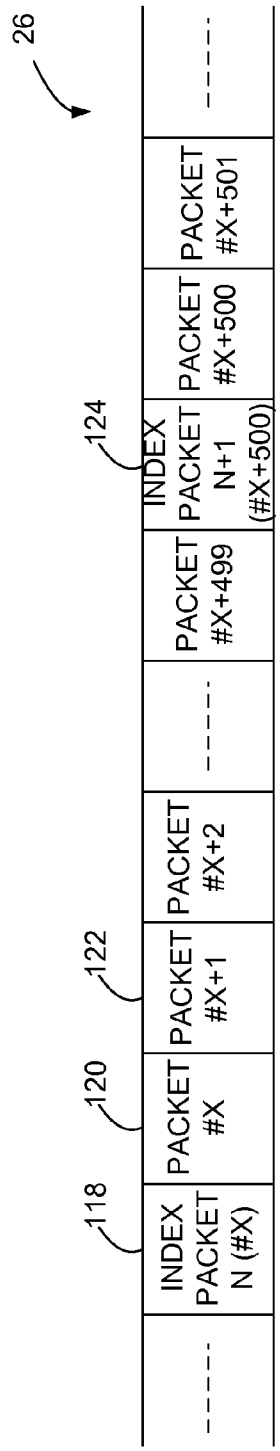
FIG. 2A
FIG. 2B

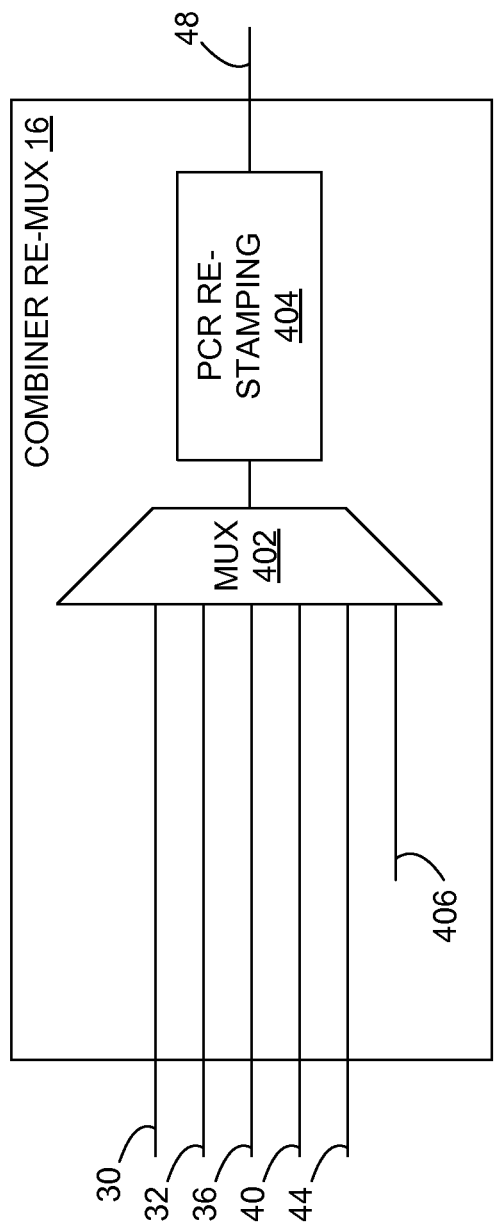

REMOTE RE-MULTIPLEXING WITH PACKET INCLUSION

CROSS-REFERENCE TO RELATED APPLICATIONS

This application is a continuation of co-pending U.S. utility application entitled "REMOTE RE-MULTIPLEXING OF TRANSPORT STREAMS" having Ser. No. 12/685,128, filed Jan. 11, 2010, which is entirely incorporated herein by reference.

TECHNICAL FIELD

The present disclosure relates generally to transport stream processing.

BACKGROUND

Re-multiplexing operations in subscriber television networks typically select a subset of services from a set of incoming services contained in a multi program transport stream. In general, re-multiplexing of an MPEG-2 (Moving Picture Experts Group) transport stream is a random process, in the sense that there is no guarantee that two identical re-multiplexers receiving the same input transport stream and having the same settings will generate an identical output transport stream. One reason for this randomness may be that there is, in general, no phase and/or frequency relationship between the incoming and outgoing transport streams. Another reason may be that the hardware running in the different multiplexers is started at a different instance of time and is running from a different clock source, resulting in the insertion of packets in random positions in the outgoing transport stream (e.g. null packets).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a block diagram that illustrates an embodiment of an example packet indexer of an example TSRM system.

FIG. 2B is a block diagram that illustrates an example indexed original transport stream generated by one embodiment of an example packet indexer.

FIG. 4 is a block diagram that illustrates an embodiment of an example combiner re-multiplexer of an example TSRM system.

DESCRIPTION OF EXAMPLE EMBODIMENTS

Overview

Figure 1:
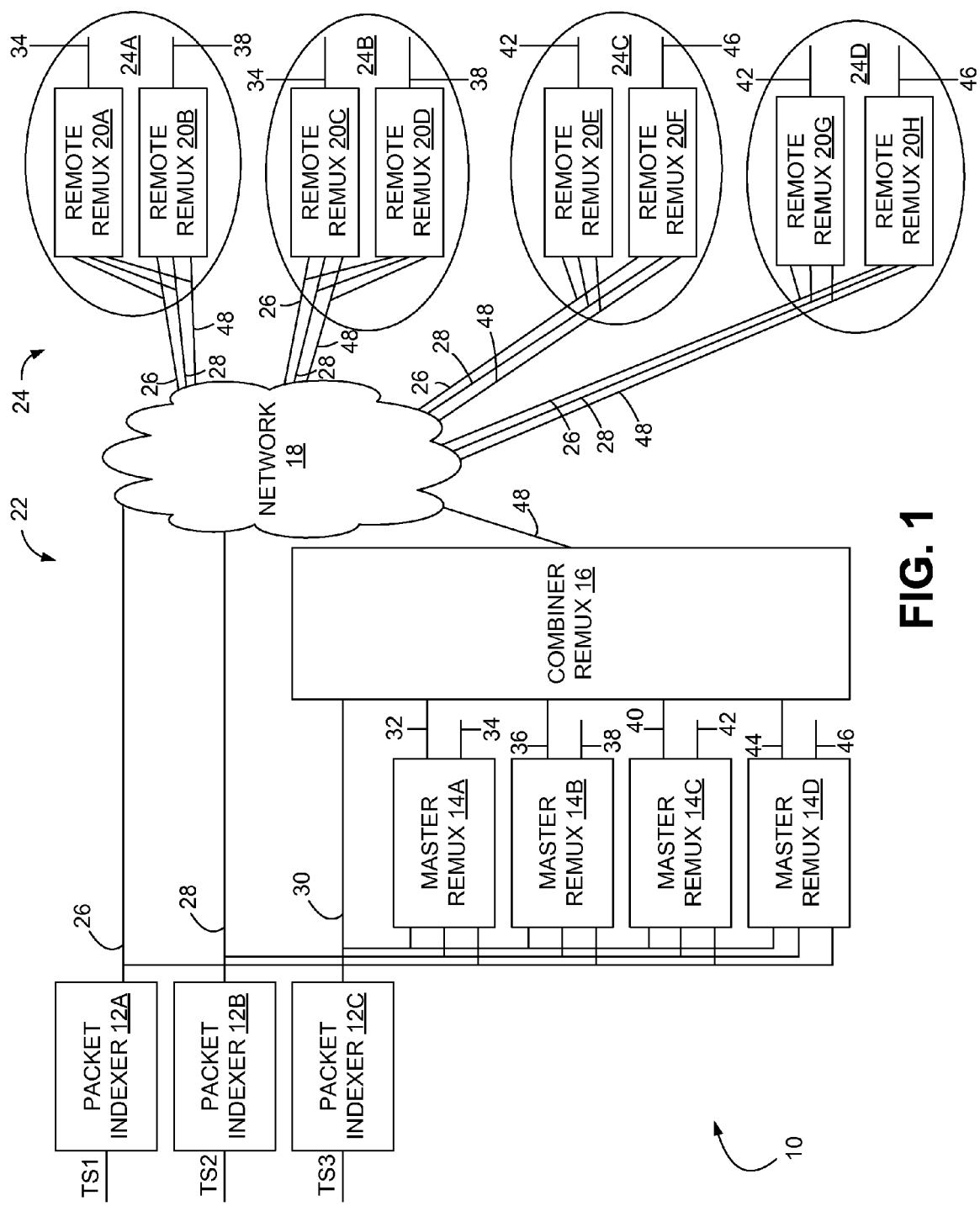
FIG. 1 is a block diagram that illustrates an example environment in which certain embodiments of transport stream re-multiplexing (TSRM) systems and methods can be implemented.

In one method embodiment, receiving at a first re-multiplexer and a second re-multiplexer a first indexed transport stream, the first re-multiplexer physically located at a location separate from the second re-multiplexer; receiving a helper transport stream, the helper transport stream comprising information about a set of operations associated with a previous re-multiplexing operation; re-multiplexing the first indexed transport stream at the first and second re-multiplexers based on the information; and generating by the first and second re-multiplexers a second transport stream and a third transport stream, respectively, the second transport stream identical to the third transport stream and different than the first indexed transport stream.

Example Embodiments

Disclosed herein are various example embodiments of transport stream re-multiplexing (TSRM) systems and methods in a communications environment, such as a subscriber television network, that provides a way to perform re-multiplexing on MPEG-2 (Moving Picture Experts Group) transport streams in such a way that two or more individual (remote) re-multiplexers, which are located in two or more different physical locations and not necessarily in communication with each other, generate an identical MPEG-2 transport stream (herein, also MPEG-2 TS). Note that TSRM systems and methods are collectively referred to herein also as a TSRM system or TSRM systems.

In one example embodiment of a TSRM system, all remote re-multiplexers receive one or more identical indexed multi program transport streams (MPTS). Each remote re-multiplexer performs a set of operations (re-multiplexing operations), which generally includes selecting the same MPEG-2 TS packets that are present in the re-multiplexed output, inserting the correct Program Specific Information/System Information/Program and System Information Protocol (PSI/SI/PSIP) packets, inserting all other packets that are used in the output (e.g. null packets, Digital Video Broadcast Megaframe Initialization Packet (DVB MIP) packets), and/or performing program clock reference (PCR) re-stamping.

To ensure that all remote re-multiplexers perform these operations in exactly the same way (bit-by-bit identical), one or more central re-multiplexers are used (each referred to herein also as a master re-multiplexer or master re-mux). Each master re-multiplexer receives the one or more identical indexed original MPTSs, performs the necessary or targeted re-multiplexing operation(s) as described above, and during this process, keeps track of all re-multiplexing operations that have been performed (e.g., packet selection on the incoming MPTS, PSI/SI/PSIP insertion, PCR re-stamping, etc.). Each master re-multiplexer generates what is referred to herein as a helper transport stream (or helper TS or HTS), which contains a description of the performed set of re-multiplexing operations, and in one embodiment, comprises a single packet identifier (PID).

In one embodiment, each of the generated helper TSs is added to one of the indexed original MPTSs, and collectively sent as a single TS to one or more remote re-multiplexers. Each remote re-multiplexer separates the respective helper TS from the indexed original TS, extracts a description of all re-multiplexing operations the master re-multiplexer has performed, and applies these operations to the original MPTS(s). One result is that the re-multiplexing performed by the remote multiplexers is no longer a random process but rather, deterministic.

Although the description below focuses on the delivery of information carried in MPEG-2 transport stream packets (e.g., multi MPEG-2 programs, each program associated with its own respective time base, each program comprising one or more packetized elementary stream (PES) packet streams sharing a common time base) at the network level (e.g., MPEG-2 layer), it should be understood in the context of the present disclosure that the transport streams may be delivered without further encapsulation or with further encapsulation (e.g., in Internet Protocol, User Datagram Protocol, Real-time Transport Protocol, etc.). In addition, though transport streams for the delivery of coded video, images, audio, graphics, and/or data are described in the context of MPEG-based transport mechanisms, transport mechanisms compliant to other specifications and/or standards are contemplated to be within the scope of the present disclosure. Further, though described in the context of MPEG-2 coding, other coding standards for video (e.g., AVC, etc.), audio (e.g., MP3, etc.), or other media are contemplated to be within the scope of the disclosure.

These and other embodiments and/or other features are described hereinafter in the context of an example subscriber television network environment, with the understanding that other multimedia (e.g., video, graphics, audio, and/or data, or otherwise referred to also herein individually or collectively as media content) environments may also benefit from certain embodiments of the TSRM systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a block diagram of an example environment, a subscriber television network 10, in which certain embodiments of TSRM systems and/or methods may be implemented. It should be understood by one having ordinary skill in the art, in the context of the present disclosure, that the subscriber television network 10 shown in FIG. 1 is merely illustrative, and should not be construed as implying any limitations upon the scope of the disclosure. The subscriber television network 10 generally includes a central headend 22, a transparent broadcast network (e.g., one or more satellite links) 18, and one or more remote headends 24. In some embodiments, the central headend 22 and/or one or more of the remote headends 24 may instead be nodes, hubs, among other facilities or points in a network. The central headend 22 includes one or more packet indexers 12 (e.g., 12A, 12B, and 12C), one or more master re-multiplexers (master remuxes) 14 (e.g., 14A, 14B, 14C, and 14D), and a combiner re-multiplexer (combiner remux) 16. The remote headends 24, one or more of which are located in physically different locations and/or not in communication with one another, each comprise one or more remote re-multiplexers 20 (e.g., remote re-multiplexers 20A, 20B in remote headend 24A, remote re-multiplexers 20C, 20D in remote headend 24B, remote re-multiplexers 20E, 20F in remote headend 24C, and remote re-multiplexers 20G, 20H in remote headend 24D). Note that the quantity of the components in the illustrated network 10 are not intended to be limiting, and that one having ordinary skill in the art should understand in the context of the present disclosure that quantities other than shown may be implemented.

The packet indexers 12 each receive a multi program transport stream (MPTS), shown in FIG. 1 respectively as TS1 at the input of packet indexer 12A, TS2 at the input of packet indexer 12B, and TS3 at the input of packet indexer 12C. The packet indexers 12 uniquely identify each of the MPEG-2 TS packets of the original transport streams (TS1, TS2, and TS3) to facilitate remote re-multiplexing in a manner as described below. Each of the MPTSs contains multiple services that are re-multiplexed at the remote headends 24 to a number of new (re-multiplexed) MPTSs. For instance, in DVB-Terrestrial (DVB-T) Single Frequency Networks, each of these new MPTSs may be used in different remote locations and needs to be bit-by-bit identical.

By performing the re-multiplexing operations at the remote headends 24, bandwidth consumption may be reduced compared to conventional networks. That is, in many implementations, a service may belong to more than one new MPTS, and as such, is distributed more than once to each remote headend hence occupying multiple times its bandwidth. In contrast, certain embodiments of the TSRM systems described herein deliver the original MPTSs to each remote headend 24 via the network 18 and perform the re-multiplexing in the remote headends 24. In general, since each service is only sent once to each remote headend 24, the transmission of that service only occupies its bandwidth once.

In view of the random (non-deterministic) behavior generally found in various re-multiplexing operations, an additional feature of certain embodiments of the TSRM systems is the provision of bit-by-bit identity between the output MPTSs (e.g., 34 at remote headend 24A and 34 at remote headend 24B) of plural remote re-multiplexers 24, as further described below.

The master re-multiplexers 14A, 14B, 14C, and 14D, located in one embodiment in the central headend 22, each receive the indexed original transport streams 26, 28, and 30 from the packet indexers 12A, 12B, and 12C, and generate new MPTSs TSA 34, TSB 38, TSC 42, and TSD 46, respectively. For instance, each new MPTS (e.g., TSA 34) may comprise a subset of the services provided among the received indexed streams 26, 28, and 30. Note that the quantity of generated MPTSs is provided as an example illustration, and that fewer or greater quantities of generated MPTSs may be implemented in some embodiments. In one embodiment, one master re-multiplexer, such as master re-multiplexer 14A or master re-multiplexer 14B, is used to generate each respective new TS, such as transport stream "A" (TSA) 34 from master re-multiplexer 14A, or TSB 38 from master re-multiplexer 14B. During the re-multiplexing operations, the master re-multiplexers 14 keep track in one embodiment of all re-multiplexing operations that are performed (e.g., packet selection on the incoming MPTSs, null packet insertion, PSI/SI/PSIP regeneration and insertion, and/or PCR re-stamping of the outgoing transport stream, etc.). Each of the master re-multiplexers 14 further generates a respective helper transport stream (helper TS or HTS), such as HTSA 32, HTSB 36, HTSC 40, and HTSD 44. Each helper TS contains a description of all the re-multiplexing operations performed by the corresponding master re-multiplexer 14. Note that one helper TS (e.g., HTSA 32) is generated for each new TS (e.g., TSA 34).

In one embodiment, the combiner re-multiplexer 16 combines the helper TSs (e.g., HTSA 32, HTSB 36, HTSC 40, and HTSD 44) with one of the indexed original MPTSs (e.g., indexed original TS3 30), and provides the combination (indexed original TS3 30 and helper TSs 32, 36, 40, and 44) as one single MPTS 48 that is broadcast over the network 18 to the remote headends 24. In some embodiments, the helper TSs 32, 36, 40, and 44 can be divided over different indexed original MPTSs, the combination achieved via one or more combiner re-multiplexers, or in some embodiments, delivered as a dedicated (e.g., without combination to one of the indexed original MPTSs) transport stream.

The network 18 may be a one-way network or, in some embodiments, a bi-directional network, and may include a cable television network, a satellite television network, a terrestrial network, an IP network, or a combination of two or more of these types of networks or other networks. Further, network PVR and switched digital video are also considered within the scope of the disclosure. Generally, the network 18 may comprise a single network, or a combination of networks (e.g., local and/or wide area networks, wired and/or wireless, etc.). For instance, the network 18 may comprise a wired connection or wireless connection (e.g., satellite, wireless LAN, etc.), or a combination of both. In the case of wired implementations, the network 18 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

In the remote headends 24, the remote re-multiplexers 20 each receive the indexed original MPTSs (e.g., 26 and 28) provided over the network 18 from the respective packet indexers 12, and separate the helper TSs (e.g., HTSs 32, 36, 40, and 44) from the indexed and combined TS 48, extract information corresponding to all re-multiplexing operations the master re-multiplexers 14 have performed, and apply these operations to the indexed original TSs 26, 28, and 30 to generate new MPTS 34, 38, 42, and 46 for further processing and/or delivery to customer premises, intervening facilities, etc. One result of the aforementioned TSRM operations is that the re-multiplexing done by the remote multiplexers 20 is no longer a random process but rather, deterministic.

The subscriber television network 10 may comprise one or more other servers, routers, and/or switches at one or more locations of the network 10 that process and deliver and/or forward (e.g., route) various digital services to subscribers. Such digital services may include broadcast television programming, video-on-demand (VoD), pay-per-view, music, Internet access, e-commerce (e.g., online shopping), voice-over-IP (VoIP), and/or other telephone or data services. In one embodiment, the components of a TSRM system comprise one or more master re-multiplexers 14, one or more remote re-multiplexers 20, or a combination of both. In some embodiments, the components of a TSRM system comprises additional components in combination with the master-re-multiplexer 14 or the remote re-multiplexer 20 (or the combination of both), such as one or more of the packet indexers 12, and/or other components (e.g., processors, transmitters, receivers, transceivers, repeaters, modulators, control modules, etc.) as should be understood by one having ordinary skill in the art in the context of the present disclosure.

In some embodiments, the subscriber television network 10 (or components thereof) may further comprise additional components, such as Quadrature Amplitude Modulation (QAM) and/or Quadrature Phase Shift Keying (QPSK) modulators, transmitters, receivers, transceivers, routers, modems, bridges, Internet Service Provider (ISP) facility servers, private servers, on-demand servers, channel change servers, multimedia messaging servers, program guide servers, gateways, multiplexers, and/or digital control modules, among other equipment, components, and/or devices well-known to those having ordinary skill in the art.

As explained above, the master re-multiplexers 14 (one for each new TS 34, 38, 42, and 46) re-multiplex each original indexed TS (e.g., 26, 28, 30) and keep track of all operations the respective re-multiplexers have performed. In general, one or more of the following re-multiplexing operations are described as part of a helper TS (e.g., HTSA 32): packet filtering information, null packet insertion data and the location of the corresponding packets, PSI/SI/PSIP re-generation and insertion data and the location of the corresponding packets, insertion of other packets and their location, and PCR re-stamping data and the location to which this data applies. As indicated above, for most of the operations, a packet location is to be described, and the packet location is relative to the other packets that are included in the original TS (TS1). In general, MPEG-2 TS packets do not have a unique index and as such an MPEG-2 TS does not enable a unique address for each individual packet for the disclosed re-multiplexing and helper TS generation operations. For instance, each PID has a continuity counter value, but since this value is only four (4) bits wide, it does not serve this unique addressing purpose.

The index counter implemented in one embodiment of packet indexers 12 is unique over a limited time or packet quantity window. In one embodiment, the width of the index counter is large enough to enable the remote re-multiplexers 20 to cope with the delay between an indexed TS (used at the remote re-multiplexers 20) and a helper TS (also used at the remote re-multiplexers 20). As such, the minimum width for the index counter may be determined by the TS bit rate of both the indexed TS (e.g. indexed TS1 26) as the newly generated TS (e.g. TS 34) and also by the amount of newly generated TS packets that can be described in multiplex description packets (which determines the delay between the indexed TS and the multiplex description packets). As an illustrative yet non-limiting example, if the bit rate of the indexed TS 26 is 200 Mbps, the bit rate of new TS 34 is 10 Mbps, and a maximum of 376 TS packets can be described in the multiplex description packets (e.g., 184 bytes/packet*2), then the minimum index counter width can be computed as log 2(376/10 e6*200 e6), which results in a rounded-up integer value of 13 bits. Accordingly, one conservative choice for the index counter minimum width may be 16-bits, though not limited to this value or manner of computation.

To describe the re-multiplexing operations listed above, the packet indexers 12 each assign a unique number for a given time or packet count window to each packet in the respective original MPEG-2 TS, as described above. FIG. 2A is a block diagram that illustrates an embodiment of an example packet indexer, such as packet indexer 12A shown in FIG. 1 (though applicable to other packet indexers 12). It should be understood by one having ordinary skill in the art, in the context of the present disclosure, that the packet indexer 12A shown in FIG. 2A is merely illustrative, and should not be construed as implying any limitations upon the scope of the disclosure. The packet indexer 12A comprises a packetizer 102, an index counter 104 (e.g., with a counter value width of 16-bits as one example among many), a multiplexer 106, and a PCR re-stamping module 108.

In general, packet indexing information is mapped in MPEG-2 packets having a unique PID value (e.g., over a defined time window) and these packets are added to original TS1 by the packet indexer 12A. With reference to the example indexed original transport stream TS1 26 illustrated in FIG. 2B and the packet indexer 12A of FIG. 2A, in one example operation, the multiplexer 106 receives original TS1 at input 110. The multiplexer 106 communicates the packet arrival to the index counter 104, which generates a counter value (index packet counter value, "X", such as 16 bits in width, though other widths may be used) for the received packet, and passes the counter value to the packetizer 102. The packetizer 102 packetizes the index packet counter value and inserts the resulting index packet N 118 into TS1. For each consecutive packet to be output from the multiplexer 106, the multiplexer 106 increases the counter value by one (1) and updates the index counter 104. The counter value contained in an index packet N 118 is the packet index of the packet 120 (#X) immediately following the index packet 118. The packet right after that packet (packet 122, following packet 120) has an index value (#X+1) that is increased by one and so on, until the next index packet 124 (N+1, with a value of X+500 for this example) is to be inserted. For index packet N+1 124, the counter value updated by index counter 104 is provided to packetizer 102 for insertion into TS1. In other words, the multiplexer 106 counts the outgoing TS packets, updates the index counter 104, and inserts the index packets 118, 124, etc. at the correct location.

The index packet counter value includes newly inserted null packets via input 112. Since the packet indexer 12A increases the bit rate of the indexed, output TS 26 (e.g., to fit the index packets 118, 124), the packet indexer 12A inserts null packets to generate a constant bit rate, indexed TS 26. It is noted from FIG. 2B that the index packet counter value does not include the index packets, though some embodiments may include the index packets as part of the count.

In some embodiments, a single index packet (e.g., 118) may be used under the assumption that the indexed TS1 26 is a continuous stream of packets and the index packets should not create discontinuities (which is one explanation as to why the frequency of the index packets only determines the start-up time of the master re-multiplexers 14 and the remote re-multiplexers 20). In some embodiments, such as for error resilience implementations, each of the master re-multiplexers 14 and the remote re-multiplexers 20 checks the correctness of each index packet 118, 124, etc. and takes appropriate (e.g., corrective) action in case errors are detected (e.g., the received index packet counter value is different from a counter value extrapolated from the previous index packet).

The index packets 118, 124, etc. have a PID value that, in one embodiment, is not also used in the incoming original TS1 (e.g., to avoid PID collisions in the indexed TS1 26). For instance, the PID value corresponding to the index packets 118, 124, etc. is not referenced in any of the PSI/SI/PSIP sections and as such, can be considered "ghost" PID or un-referenced PID. In some embodiments, the packet indexer 12A may be configured to replace null packets with index packets.

To keep the PCR values correct in the indexed original TS (e.g., 26), the PCR re-stamping module 108 re-stamps the PCR values.

In one embodiment, the actual packet indexing comprises inserting index packets 118, 124, etc. in the original TS (e.g., TS1) at regular intervals (e.g. every 100 milliseconds, though not limited to this value nor limited to regular intervals). The actual frequency of these index packets may determine the start-up time of the remote re-multiplexers 20, as indicated above.

Figure 3A:
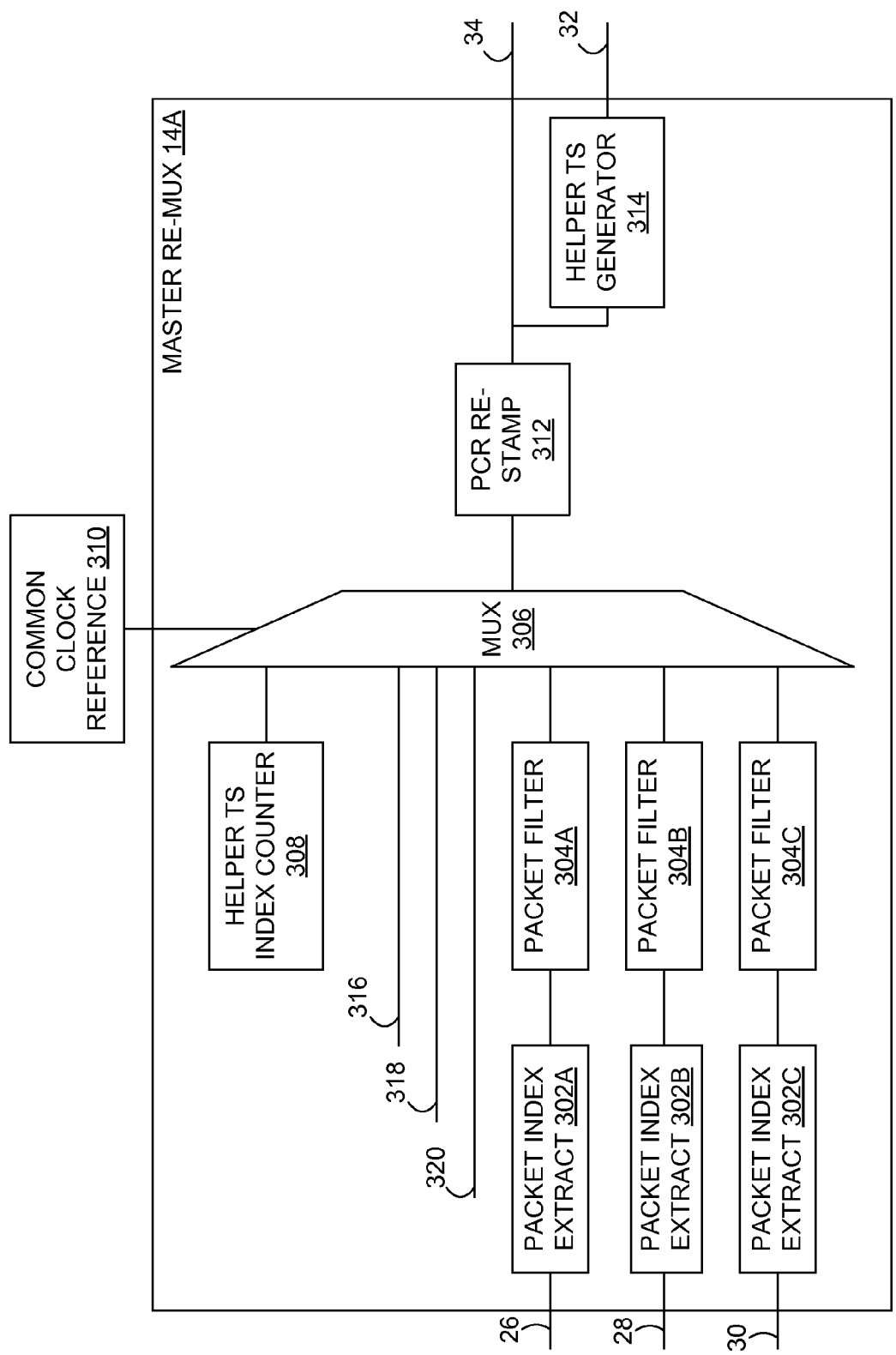
FIG. 3A is a block diagram that illustrates an embodiment of an example master re-multiplexer of an example TSRM system.

Having described an example embodiment of a packet indexer 12A, attention is now directed to FIG. 3A, which illustrates an example embodiment of a master re-multiplexer, such as master re-multiplexer (master re-mux) 14A. The master re-multiplexer 14A, in general, selects a number of services from one or more indexed original transport streams received from the packet indexers 12 based on execution of a set of operations (e.g., packet filtering and re-multiplexing of MPEG-2 TS packets on different input TSs, bit rate adaptation with null packet insertion, PSI/SI/PSIP re-generation and insertion, insertion of other packets, and PCR re-stamping). The complete description of these operations (referred to herein also as re-multiplexing operations) is mapped in a separate TS (helper TS, such as HTSA 32) comprising, in one embodiment, a single PID, as explained above.

The master re-multiplexer 14A comprises one or more packet index extractors 302 (e.g., 302A, 302B, and 302C) coupled to one or more respective packet filters 304 (e.g., 304A, 304B, and 304C). The packet filters 304 are each coupled to a multiplexer 306. One purpose of a re-multiplexing operation is to select a subset of services from a set of incoming services contained in multiple indexed original TSs 26, 28, and 30. The packet index extractors 302 extract the packet index for each packet in the incoming indexed TS and add this index value to each packet as metadata (to be used later on, as explained below). For example, each packet index extractor 302 contains a counter with the same width as the packet index value inserted at the packet indexers 12. Upon receiving a packet index packet, each of the packet index extractors 302 initializes its own counter by the received value and increments the value for each incoming (including non-packet index packets) packet. The value of the counter for each of the packet index extractors 302 can be added to each incoming packet as metadata.

Explaining further, each of the packet index extractors 302 extracts the index packets (e.g., 118, 124) from the indexed original TSs (e.g., 26, 28, and 30) and uses the content of these extracted packets to add an index (counter value) to each packet that comes in. The counter value added by the packet index extractor 302 is the same as the value in each of the packet index packets. As described above in association with FIG. 2A, at least in some embodiments, packet indexes are not inserted by the packet indexers 12 for each original TS packet (e.g., each packet in indexed original TS1 26), but rather, an index packet (e.g., N 118, N+1 124) is added at defined intervals or packet counts (e.g., in the example illustrated in FIG. 2B, one index packet for every five hundred (500) useful packets). Therefore, the packet index extractors 302 use their own respective counters to add a packet index value to each incoming packet of the respective indexed TS, such as by interpolating the packet index values between two consecutive packet index packets 118 and 124. This index is added as metadata to each incoming packet to be easily used later on in the processing chain, as explained further below.

The packet filters 304 pass all MPEG-2 TS packets corresponding to indexed transport streams 26, 28, and 30 that are to be output by the master re-multiplexer 14A and block all packets that are not needed (e.g., packets that belong to services that are not needed at the output and all incoming null packets). It is noted that, since all packets arrive sequentially in the master re-multiplexer 14A, in general, the packet filtering operation is deterministic if all master re-multiplexers 14A, 14B, 14C, and 14D have the same filtering settings. However, since there is in general no frequency and/or phase relationship between the different input indexed original TSs 26, 28, and 30, re-multiplexing the filtered packets from the different indexed original TSs is not deterministic.

The multiplexer 306 is further coupled to a helper TS index counter 308, a common clock reference 310, and a PCR re-stamp module 312, the latter coupled to a helper TS generator 314 as explained below in association with FIG. 3B. Additional inputs to the multiplexer 306 include PSI/SI/PSIP packets 316, null packets 318, and other packets 320. Note that reference to the inserted packets is shown and described conceptually with reference to the respective input line coupled to the multiplexer 306, with the understanding that the inserted packets may arrive at the multiplexer 306 on fewer inputs (e.g., a single input) in some embodiments. The output TS of the master re-multiplexer 14 (and remote re-multiplexers 20) are locked to a common clock reference or source 310 (e.g. via a global positioning system (GPS) or by reconstruction of the TS clock in the remote re-multiplexers 20).

With regard to the null packets 318, in general, the bit rate of an output TS of a re-multiplexer is different than that of the corresponding incoming TSs. This means that the output TS is generated by a reference clock that is, in general, different from that of the input TSs and has no relationship at all (frequency, phase) with the input reference clocks. Most TSs comprise a constant bit rate. In general, adding up the bit rate of all useful packets in a TS does not give a constant bit rate. Therefore, a constant bit rate TS is generated by adding MPEG-2 null packets 318 in such a way that the resulting bit rate is constant. The operation of modifying the bit rate of an incoming TS by using a reference clock 310 that has no relation with the reference clock of the incoming TS and by inserting null packets 318 is in general not deterministic. Since there is no frequency or phase relationship between the incoming TS and the outgoing TS, the null packets 318 are inserted at random positions in the output TS (output from the multiplexer 306).

With regard to the PSI/SI/PSIP packets 316, PSI, SI and/or PSIP information are typically included in a TS, though in most cases, not all in the same TS. One purpose for the PSI, SI and/or PSIP information is to describe the content of the TS (e.g. number of services, information on how to decode these services, service names, EPG, etc.). When a TS is re-multiplexed by removing services, the original PSI, SI and PSIP information is no longer correct, since such information still refers to the removed services or to the characteristics of the original TS. Therefore, in the re-multiplexing operations of the master re-multiplexer 14A, there occurs a regeneration (e.g., update) of the PSI/SI/PSIP information. Note that reference to PSI/SI/PSIP herein refers to PSI, SI, or PSIP alone or in some combination of two or more of PSI, SI, or PSIP. This regenerated information is re-inserted into the output TS of the multiplexer 306. In case the packet filtering settings are identical on all master re-multiplexers 14A, 14B, 14C, and 14D, generation of the PSI/SI/PSIP sections is normally identical. The sections are mapped into MPEG-2 TS packets and the continuity counter of these packets is generally different. The packetized sections 316 are inserted into the output TS and the location of the PSI/SI/PSIP packets relative to the other packets in the output TS is in general random. Thus, PSI/SI/PSIP regeneration and insertion in general is not a deterministic process.

Other packets 320 can be inserted into the re-multiplexed TS. An example of such a packet is a Megaframe Initialization Packet (MIP) used in DVB-T SFN networks, though other packets are contemplated, such as private data packets, among others.

With regard to the PCR re-stamp module 312, most of the incoming, indexed TSs contain packets carrying timing information in fields that are used to correctly decode compressed video and audio information. These timing fields are called PCR fields. When re-multiplexing by removing packets, inserting new packets (e.g. null packets and PSI/SI/PSIP packets) and using a new reference clock to generate the output TS, the time difference between two consecutive and corresponding PCR packets changes. The PCR re-stamp module 312 implements a process referred to herein as PCR re-stamping, wherein the module 312 updates the PCR fields of the output TS to remain correct. The PCR re-stamping operation depends on the amount of new packets that are inserted between two consecutive PCR packets. Since the insertion of null 318 and PSI/SI/PSIP packets 316 is a random operation, as explained above, PCR re-stamping is, in general, not a deterministic operation.

Since a re-multiplexer performs a number of operations which are random by nature, the operation of a re-multiplexer, without the benefit of the TSRM systems disclosed herein, is not deterministic, with a result that two identical re-multiplexers, each receiving the same input TS and each having the same re-multiplexing settings, generate two bit-streams that are not bit-by-bit identical.

With this overview in place, attention is now directed to the components and/or process involved in the generation of metadata and in general, a helper TS. As explained above, each of the input packet filters 304 passes all packets that are included in the re-multiplexed output, and blocks all packets that are not to be included in the re-multiplexed output. Passed packets are sent to the multiplexer 306. The multiplexer 306 re-multiplexes the passed input packets with PSI/SI/PSIP packets 316, null packets 318, and all other packets (e.g. DVB-T SFN MIP packets, among others) 320 that are inserted. For each multiplexed packet, metadata is added to the packet by the multiplexer 306. The content of the metadata depends on the type of packet that has been inserted, for example as depicted in the following table (Table A):

TABLE A

| Packet type | Packet type field | Additional metadata | |
|---|---|---|---|
| null packet | 0 | — | — |
| PSI/SI/PSIP packet | 1 | Helper TS Packet Index | — |
| Other inserted packets | 2 | Helper TS Packet Index | — |
| Input TS packet | 3 | Input TS Number | Packet Index |

In one embodiment, the metadata of each inserted packet contains at least a packet type field, which may identify packet types (e.g., four major packet types) that can be inserted by the multiplexer 306. As noted from the table above, null packets 318 inserted by the multiplexer 306 receive a packet type field and no additional metadata.

The helper TS index counter 308 is configured to add an index value (referred to herein also as a helper TS index value and corresponding to the helper TS packet index shown in Table A) to the metadata for inserted PSI/SUP SIP packets 316 and the other inserted packets 320. In one embodiment, the helper TS index value is a counter value that is incremented by one (1) each time a PSI/SI/PSIP 316 or other packet 320 is inserted by the multiplexer 306.

After the packets have been multiplexed by multiplexer 306, the PCR fields are re-stamped by the PCR re-stamp module 312 as explained above. After re-stamping, the PCR re-stamp module 312 adds the re-stamped PCR field as metadata to the packet.

The master re-multiplexer 14A comprises a helper TS output 32 and a re-multiplexed TS output 34, the output of which (for the re-multiplexed TS output 34 from master re-multiplexer 14A) is optional (e.g., such as for monitoring purposes when the metadata is removed, among other functions or architectures, such as where there is a DVB-T transmitter located in the central headend 22).

Although described using a single master re-multiplexer 14A for illustrative purposes, it should be understood that the above-description applies to the other master re-multiplexers 14B, 14C, and/or 14D, hence discussion of the other master re-multiplexers 14B, 14C, and 14D is omitted for brevity. Further, it should be understood by one having ordinary skill in the art, in the context of the present disclosure, that should more than one new TS be generated, the same indexed original TSs are processed by all master re-multiplexers 14 (e.g., 14A, 14B, 14C, and 14D). Each of the master re-multiplexers 14 generates its own helper TS (e.g., each having a separate PID value), as mentioned above.

The helper TS generator 314 receives information for further processing based on the content of the re-multiplexed MPEG-TS and metadata provided as a result of the above-described operations of the master re-multiplexer 14A logically and/or physically performed upstream of the helper TS generator 314. Referring now to FIG. 3B, shown is an example embodiment of a helper TS generator 314. The helper TS generator 314 is coupled to the output of the PCR re-stamp module 312, and as shown in FIG. 3B, comprises a helper TS packet filter 332 and a helper TS index inserter 334, the latter coupled to the output of the helper TS packet filter 332 and to the input of a multiplexer (mux) 336. The helper TS generator 314 further includes a multiplexer (mux) description generator 338 and a packetizer 340, the latter coupled to the output of the multiplexer description generator 338 and to the input of the multiplexer 336. The multiplexer 336 is coupled at its output to a repacking (repack) module 342, the latter providing an output helper TSA 32.

The multiplexer description generator 338 receives the re-multiplexed TS from PCR re-stamp module output, including all metadata added to the packets. The multiplexer description generator 338 generates a compact description of the re-multiplexing operations. Since all packets in the re-multiplexed TS output are sent to the multiplexer description generator 338, the latter receives a continuous list of the packets that are present in the re-multiplexed TS output including additional data on these packets. One example (for illustrative purposes, with the understanding that other values or formats are contemplated) of the contents of such a list, among other examples, is as follows (Table B below):

TABLE B

| Packet type field | Helper TS Packet Index | Input TS # | Input Packet Index | PCR Field |
|---|---|---|---|---|
| ... | ... | ... | ... | ... |
| 0 | — | — | — | — |
| 3 | — | 1 | 7005 | — |
| 1 | 312 | — | — | — |
| 3 | — | 2 | 1503 | 0x12345678901 |
| 3 | — | 1 | 7010 | — |
| 0 | — | — | — | — |
| 1 | 313 | — | — | — |

TABLE B-continued

| Packet type field | Helper TS Packet Index | Input TS # | Input Packet Index | PCR Field |
|---|---|---|---|---|
| 3 | — | 2 | 1505 | — |
| 2 | 314 | — | — | — |
| ... | ... | ... | ... | ... |

It is noted from the above-list that the packet index for two consecutive input TS packets coming from the same input TS (e.g., 7005 and 7010) can show gaps because of packet filtering, whereas, at least in one embodiment, the helper TS packet index is incremented by one for two consecutive helper TS packets. In one embodiment, the multiplexer description generator 338 formats the list in a compact format and the packetizer 340 maps the same to MPEG-2 TS packets, referred to herein also as multiplex (mux) description packets.

One having ordinary skill in the art should understand, in the context of the present disclosure, that there are a variety of mechanisms that may be employed to implement such compaction formatting. One example mechanism is described as follows, with the understanding that other mechanisms are contemplated to be within the scope of the disclosure. Each multiplex description information (e.g., in the form of a table or list, as shown in Table C) starts with plural N-bit pointer values, where N is an integer value sufficient to enable identification and/or location of packets (e.g., the same width as the index packet values, described above using 16-bits, though not limited to sixteen (16)). A first pointer value is referred to as a helper TS base pointer. The helper TS base pointer corresponds to a helper TS packet index (index value) of the first helper TS packet (for indexed TS1 26) that is described in the multiplex description information. Another N-bit pointer value (e.g., 16-bits) is needed for each possible TS input (e.g., one for indexed TS1 26, one for indexed TS2 28, one for indexed TS3 30, etc.). The latter-type pointer(s) are called the input TS base pointers. Each input TS base pointer corresponds with the input TS packet index of the first input TS packet of each input TS that is described in the multiplex description information. Each consecutive entry in the multiplex description information (after the aforementioned pointer values) describes a packet in the output TS (e.g., output from re-stamp module 312), including the type of packet and its metadata.

In one embodiment, for each input TS packet coming from a respective indexed, input TS, the corresponding packet index may be coded as an offset to the packet index of the previous packet originating from the same input TS described in the multiplex description information. For example, the first input TS packet of each input TS that is described is assigned an offset of zero (0), and is added to the corresponding input TS base pointer. Note that there exists no index for null and helper TS packets, although some embodiments may use an index. A bit length field of the offset may be selected to cover the gap (e.g., in index values) between at least two consecutive passed input TS packets, while minimizing overhead of the multiplex description packet. An optional additional offset extension field may be used to extend the offset value. A typical maximum gap size is up to 16383 packets, though offset values for packet quantities above or below this number may be used. From the sequence of packets described by the above list in Table B, the following example multiplex description table or list is generated (Table C below) by the multiplexer description generator 338:

TABLE C

Help TS Base Pointer = 312
Input TS1 Base Pointer = 7005
Input TS2 Base Pointer = 1503

| Entry number | Packet type | Input TS | Offset | PCR Field |
|---|---|---|---|---|
| 0 | 0 | — | — | — |
| 1 | 3 | 1 | 0 | — |
| 2 | 1 | — | — | — |
| 3 | 3 | 2 | 0 | 0x12345678901 |
| 4 | 3 | 1 | 5 | — |
| 5 | 0 | — | — | — |
| 6 | 1 | — | — | — |
| 7 | 3 | 2 | 2 | — |
| 8 | 2 | — | — | — |
| ... | ... | ... | ... | ... |

As can be seen from Table C above, the length of each entry depends on the type of packet that is inserted. As mentioned above, the packetizer 340 maps the list or table (Table C) to MPEG-TS packets. In one embodiment, the multiplex description packet uses a PID value of "0x1FFF" since this PID value does not occur in the helper TS (null packets are not included). Other values may be used in some embodiments. With the assistance of multiplex description packets, the remote re-multiplexers 20 can reconstruct all re-multiplexing decisions made by the master re-multiplexers 14.

With regard to the inserted packets (e.g., PSI/SI/PSIP packets, other packets), attention is directed to the helper TS packet filter 332. The helper TS packet filter 332 includes the inserted PSI/SI/PSIP packets and other packets in the helper TS. For instance, the helper TS packet filter 332 passes packets to its output and/or blocks packets. Filtering may be performed by the helper TS packet filter 332 based on the packet type field inserted by the multiplexer 306. For instance, packets with a packet type field of one (1) and two (2) are passed, and all other packets are blocked, with all packets that are passed included in the helper TS. The passed packets may also keep their original PID value.

All helper TS packets have a helper TS packet index that is added as metadata to the packets (e.g., via helper TS index counter 308). The helper TS index inserter 334 converts this metadata to index packets (helper TS index packets) in the same way as the packet indexing was performed on the original TS. The helper TS index packets, like the multiplex description packets, use a PID value of "0x1FFF." The helper TS index packets are distinguished from the multiplex description packets, such as by the use of a different flag value (e.g., in the MPEG-2 packet header) for a given field used in each type of packet.

The multiplexer 336 multiplexes the helper TS index packets with the multiplex description packets and forms a complete helper TS 344. The complete helper TS output 344 from the multiplexer 336 contains different PIDs. For instance, one PID is used for the multiplex description packets and the helper TS index packets and a number of different PIDs are used for the actual helper TS packets (PSI/SI/P SIP and other). The helper TS output 344 is passed to the repacking module 342, which maps each MPEG-2 TS packet of the helper TS output 344 to new packets of a helper TSA 32, the new packets having the same PID value (e.g., PID A). For instance, referring to FIG. 3C as one example among many, helper TS output 344 comprises plural MPEG-TS packets 346, 348, and 350, each comprising a 4-byte header, a 184-byte payload, and possibly multiple PID values (shown as PID X, PID Y, and PID Z). The repacking module 342 receives the helper TS output 344, and maps the packets of the helper TS output 344 to new packets 358, 360, and 362 of the helper TSA 32. For instance, the new TS packet 358 has a 4-byte header containing PID value A and 184 payload bytes containing the first 184 bytes (including the header) of the original packet 346. The next new TS packet 360 has a 4-byte header containing PID value A and 184 payload bytes containing the last 4 bytes of packet 346 and the first 180 bytes (including header) of packet 348, and so on. By the repacking module 342 performing this mapping from the helper TS output 344 to the helper TSA 32, the helper TSA 32 only occupies one (1) PID to ease the re-multiplexing of the helper TSA 32 with other TSs in the combiner re-multiplexer 16. In other words, the re-packed TS packets all have the same PID value. This PID value is selected in such a way that there is no conflict with other PIDs already present in the original indexed TS. Such a repacketizing operation may ease the re-multiplexing of the helper TS with the original indexed TS in the combiner re-multiplexer 16. In some embodiments, the functionality of the repacking module 342 may be implemented in the combiner re-multiplexer 16, or omitted in some embodiments.

Having described an embodiment of an example master re-multiplexer 14A, attention is now directed to an embodiment of an example combiner re-multiplexer 16, as shown in FIG. 4. The combiner re-multiplexer 16 comprises a multiplexer 402 and a PCR re-stamping module 404 coupled to the output of the multiplexer 402. The multiplexer 402 comprises plural inputs for receiving an indexed original TS (e.g., in this example, from FIG. 1, TS3 30), null packets 406 for insertion by the multiplexer 402, and plural helper TSs (e.g., helper TSA 32, helper TSB 36, helper TSC 40, and helper TSD 44). In one embodiment, the combiner re-multiplexer 16 adds the helper TSs 32, 36, 40, and 44 to one of the original indexed TSs (e.g., TS3 30), and provides the resulting combined TS 48 for broadcast (or multicast in some embodiments) to the remote re-multiplexers 20. In some embodiments, the combiner re-multiplexer 16 may add the helper TSs to plural original indexed TSs (e.g., distributed among the plural TSs or duplicated in the plural TSs). In some embodiments, the helper TSs may be provided as a stream separate from any of the indexed original transport streams.

Operationally-speaking, since the combiner re-multiplexer 16 inserts new packets (e.g., null packets 406) and creates a new combined TS 48, the combiner re-multiplexer 16 is somewhat similar to a simplified re-multiplexer.

The PCR re-stamping module 404 performs PCR re-stamping (e.g., to keep the PCR values in the indexed original TS correct). Since the combiner re-multiplexer 16 increases the bit rate of the output TS (e.g., to fit the helper TS packets), the insertion of null packets 406 enables the generation of a constant bit rate TS 48. The null packets 406 that are inserted by the combiner re-multiplexer 16 have a different format or are otherwise distinguishable from null packets of the indexed original TS (e.g., indexed TS3 30) to enable distinction between the two sets of null packets.

Figure 5:
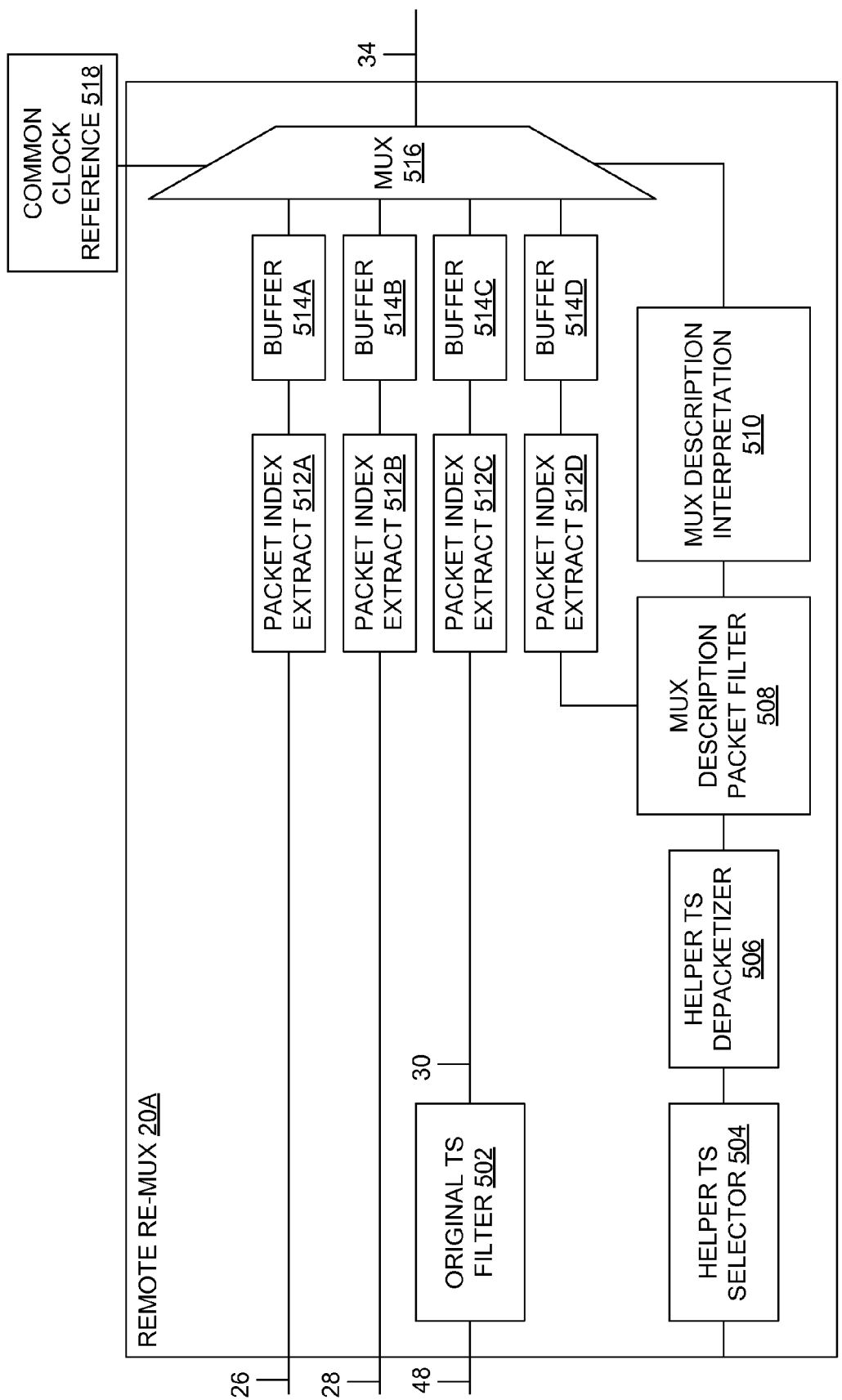
FIG. 5 is a block diagram that illustrates an embodiment of an example remote re-multiplexer of an example TSRM system.

FIG. 5 is a block diagram of an embodiment of an example remote re-multiplexer, such as remote re-multiplexer (re-mux) 20A. The remote re-multiplexer 20A shown in FIG. 5 comprises an original TS filter 502, a helper TS selector 504, helper TS depacketizer 506, multiplex (mux) description packet filter 508, multiplex (mux) description interpretation module 510, packet index extractors 512 (e.g., 512A, 512B, 512C, and 512D), buffers 514 (e.g., 514A, 514B, 514C, 514D) coupled to the input of multiplexer 516, a common clock reference 518, and inputs for indexed original TSs (e.g., indexed original TS1 26, indexed original TS2 28, etc.). In general, the remote re-multiplexer 20A receives the combined TS 48 from the combiner re-multiplexer 16 and the indexed original MPTSs (e.g., 26, 28, etc.) via the network 18, extracts the helper TS information from the incoming combined TS 48, and based on the extracted information, reconstructs all operations of the master re-multiplexers 14 to obtain exactly the same new TSs (bit-by-bit identical) as can be output by the master re-multiplexers 14.

More particularly, all necessary (necessary for the desired services to be provided by the headends 24) or targeted indexed original MPTSs (e.g., 26 and 28), including the indexed original MPTS (e.g., 30) included in the combined TS 48 containing the helper TSs, are connected to each of the remote re-multiplexers 20 (e.g., 20A-20H, though remote re-multiplexer 20A is shown for simplicity in illustration), as shown in FIG. 1. The indexed original TSs 26 and 28 (which do not contain a helper TSs) are received by the respective packet index extractors 512A and 512B, respectively. The combined TS 48 is received at the original TS filter 502, where the indexed original TS 30 is filtered out and provided to packet index extractor 512C. At the packet index extractors 512A, 512B, and 512C, the packet indexes corresponding to the indexed original TSs (e.g., 26, 28, 30) are extracted and added as metadata to the resulting packets to be used further on in the processing chain.

The helper TS selector 504 selects the correct helper TS (e.g., helper TSA 32) from the combined TS 48. The helper TS depacketizer 506 depacketizes the selected helper TS (e.g., helper TS 32) and provides the depacketized selected helper TS to the multiplex description packet filter 508.

The multiplex description packet filter 508 extracts the multiplex description packets from the selected helper TS, and provides the extracted multiplex description packets to the multiplex (mux) description interpretation module 510 and provides all other helper TS packets to the packet index extractor 512D. The packet index extractor 512D extracts the packet indexes from the helper TS and adds the extracted packet indexes as metadata to the packets. The packet index extractors 512A-512C similarly extract the packet indexes from the indexed original TSs.

The multiplex description interpretation module 510 receives the multiplex description packets from the multiplex description filter 508, interprets the helper TS information provided in the multiplex description packets, and passes these instructions (helper TS instructions) to the multiplexer 516.

As described above, the multiplexer 516 receives three types of data or content: the packets from the indexed original TSs 26, 28, and 30 (together with their respective index values), the helper TS packets determined by the helper TS selector 504 (e.g., packets corresponding to helper TSA 32) to be destined to the multiplexer 516 (together with their respective index values), and the multiplex description information (including the PCR re-stamping values). The multiplex description information, and in particular, the helper TS instructions, instructs the multiplexer 516 which packets to insert from the indexed original TSs and from the helper TS, the order in which they need to be inserted, and optionally the PCR re-stamping value to use for PCR packets. With this information, the remote re-multiplexer 20A is able to reconstruct the new TS (e.g., new TSA 34) generated by the master re-multiplexer 14A in bit-by-bit identical fashion. The helper TS instructions, together with the indexed original TSs (e.g., indexed originals TS1 26, TS2 28, TS3 30) and the helper TS (HTSA 32) enable the multiplexer 516 to generate the same output TS 34 (e.g., TSA) as the master re-multiplexer 14A has done (TSA 34).

Note that the common clock reference 518 coupled to the multiplexer 516 enables the remote re-multiplexer 20A to be clocked to the same reference clock as the master re-multiplexer 14A (e.g. via GPS or via a TS clock reconstruction circuit).

The buffers 514 (e.g., 514A, 514B, 514C, 514D) receive and buffer the packets (e.g., helper TS packets and indexed original TS packets), together with their respective index, from the respective packet index extractors 512 (e.g., 512A, 512B, 512C, and 512D). The buffers 514 compensate for the delay between the multiplex description packets and the helper TS packets and the actual indexed original TSs described in the multiplex description packets. The packets written into respective buffers 514 are read out by the multiplexer 516.

The components described above for the TSRM system (e.g., the master re-multiplexer 14, remote re-multiplexer 20, etc.) may be implemented in hardware, software, firmware, or a combination thereof. To the extent certain embodiments of the TSRM system or a portion thereof are implemented in software or firmware, executable instructions for performing one or more tasks of the TSRM system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the TSRM system or a portion thereof are implemented in hardware, the TSRM system may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 3B:
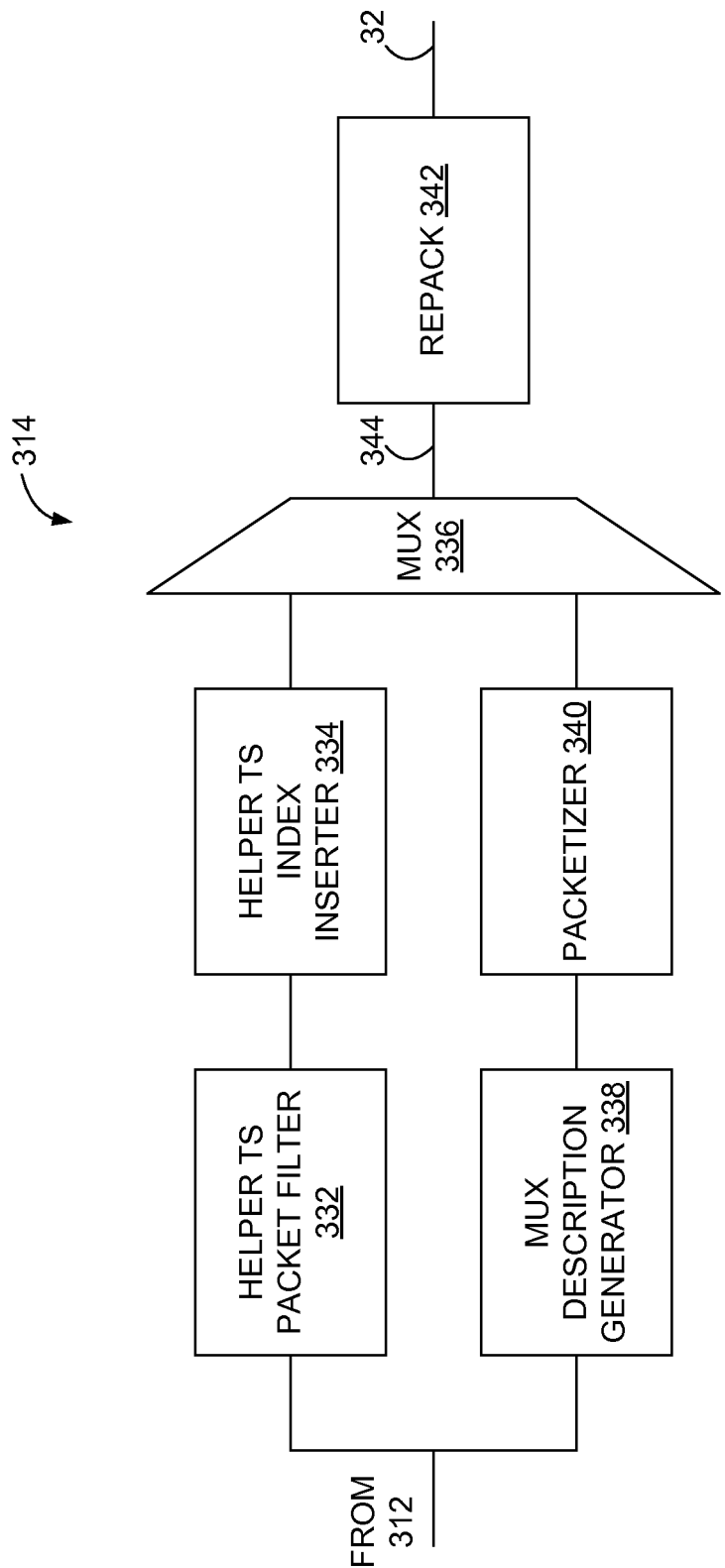
FIG. 3B is a block diagram that illustrates an embodiment of an example helper transport stream (TS) generator of a master re-multiplexer.
Figure 3C:
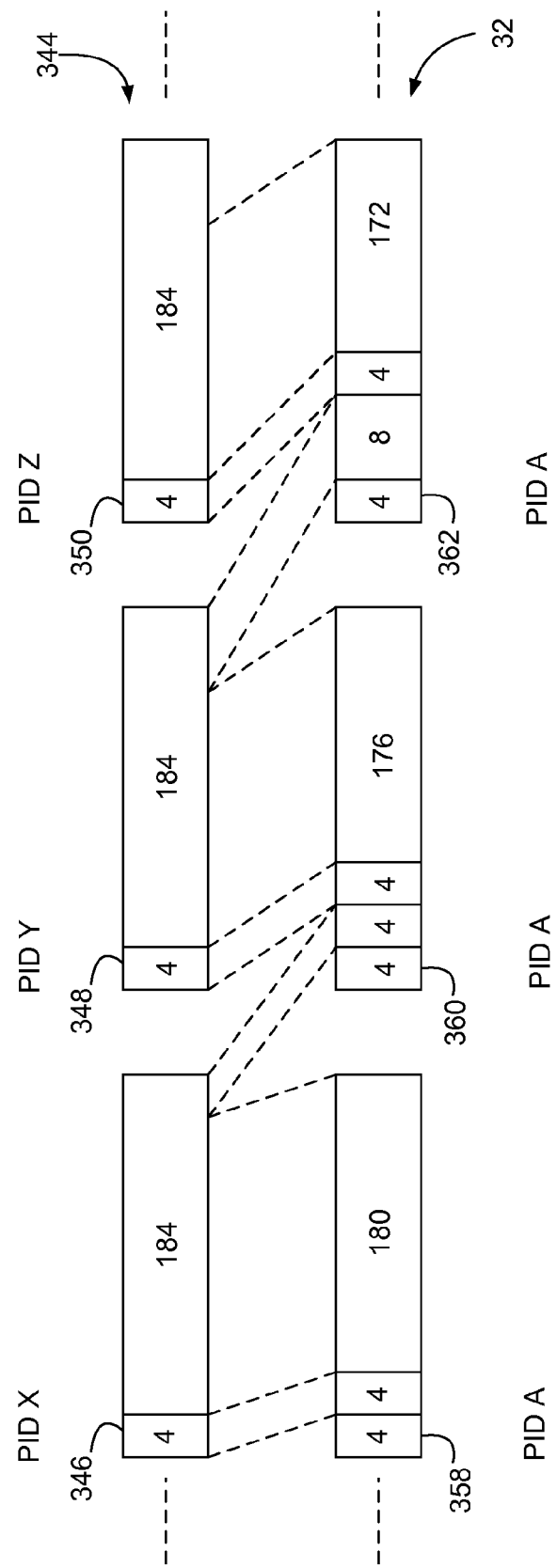
FIG. 3C is a block diagram that illustrates an embodiment of an example method implemented by an example helper TS generator for repacking a helper transport stream.
Figure 6:
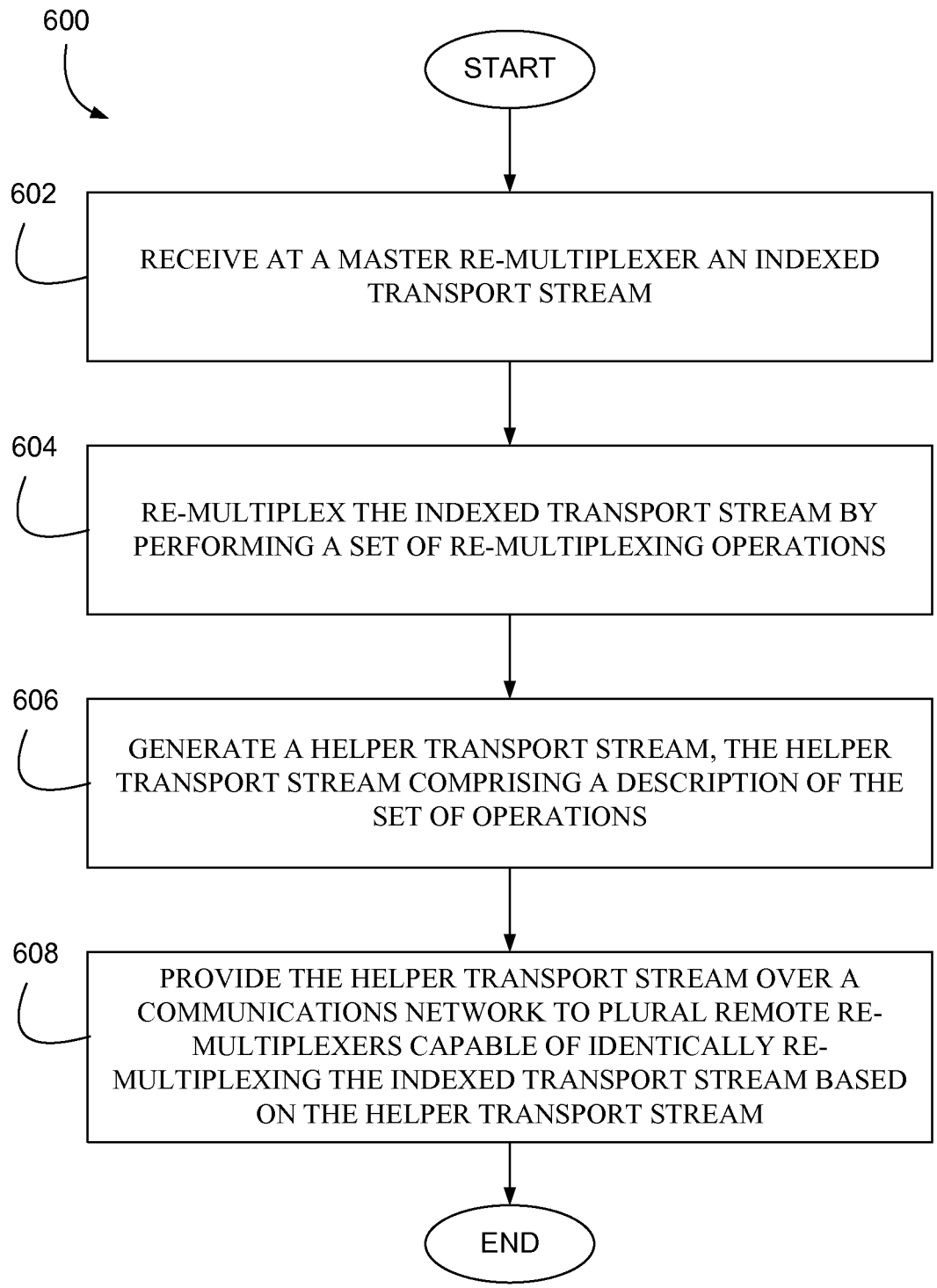
FIG. 6 is a flow diagram that illustrates one method embodiment implemented by an example master re-multiplexer of an example TSRM system.

Having described various embodiments of TSRM systems and methods, it should be appreciated that one method embodiment 600, implemented in one embodiment by logic (hardware, software, or a combination thereof as shown, for instance, in FIGS. 3A-3B) of the master re-multiplexer 14 and shown in FIG. 6, comprises receiving at a master re-multiplexer an indexed transport stream (602); re-multiplexing the indexed transport stream by performing a set of re-multiplexing operations (604); generating a helper transport stream, the helper transport stream comprising a description of the set of operations (606); and providing the helper transport stream over a communications network to plural remote re-multiplexers capable of identically re-multiplexing the indexed transport stream based on the helper transport stream (608).

Figure 7:
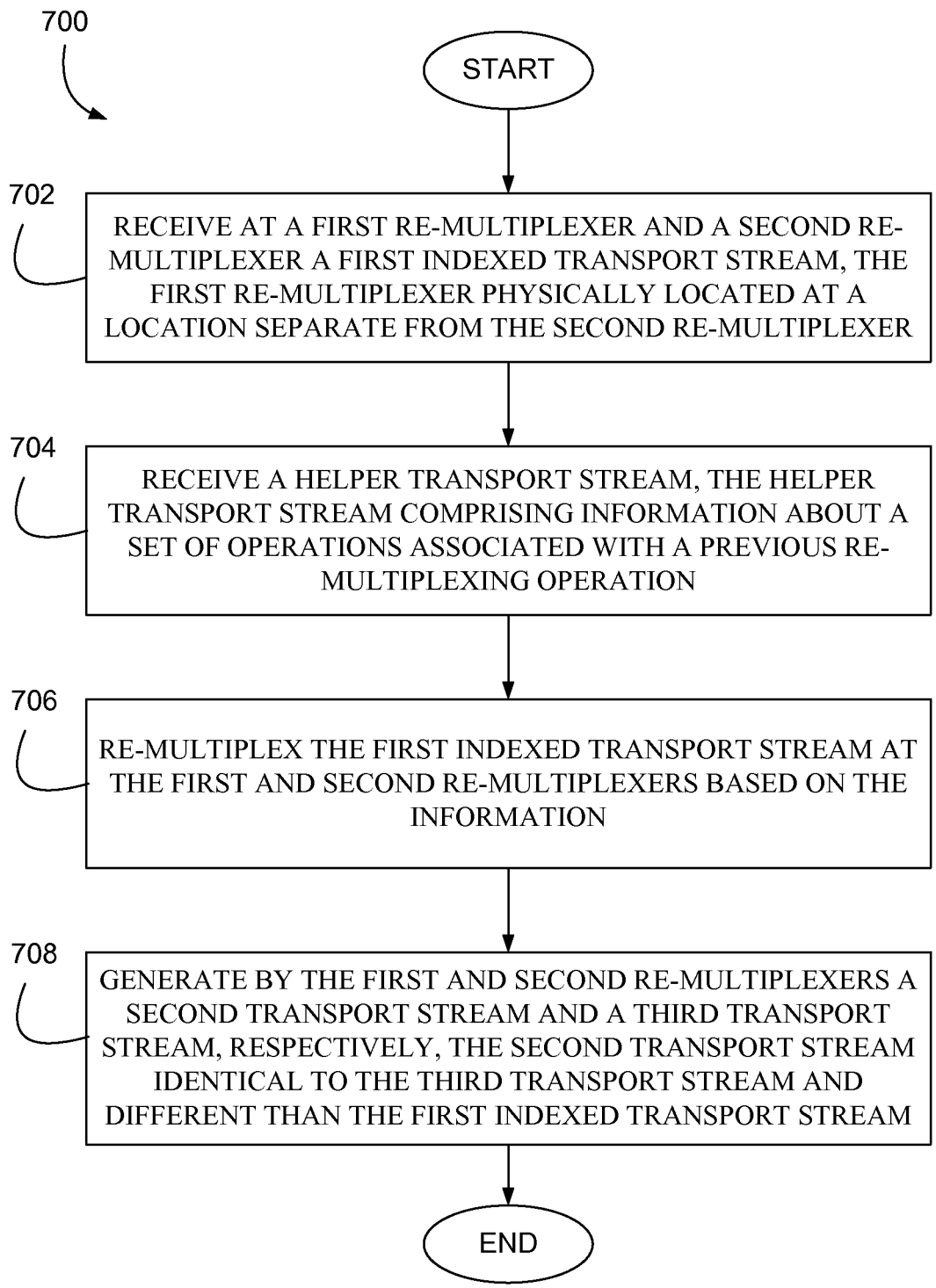
FIG. 7 is a flow diagram that illustrates one method embodiment implemented by plural example remote re-multiplexers of an example TSRM system.

Another embodiment of a TSRM method 700, implemented in one embodiment by logic (hardware, software, or a combination thereof as shown, for instance, in FIG. 5) of the remote re-multiplexer 20 and shown in FIG. 7, comprises receiving at a first re-multiplexer and a second re-multiplexer a first indexed transport stream, the first re-multiplexer physically located at a location separate from the second re-multiplexer (702); receiving a helper transport stream, the helper transport stream comprising information about a set of operations associated with a previous re-multiplexing operation (704); re-multiplexing the first indexed transport stream at the first and second re-multiplexers based on the information (706); and generating by the first and second re-multiplexers a second transport stream and a third transport stream, respectively, the second transport stream identical to the third transport stream and different than the first indexed transport stream (708).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 6 and 7 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 6 and 7, either in the beginning, end, and/or as intervening steps, or omitted in some embodiments.

One or more embodiments of TSRM, though described in the context of the environment shown in FIG. 1, have applicability to other environments and/or applications. For instance, in distribution of digital services via a DVB-T SFN as an add-on to an existing satellite Direct-To-Home (DTH) system, satellite feeds readily available for DTH distribution are re-used to distribute content to the DVB-T SFN transmitters. In a terrestrial, SFN network, all transmitters in the network (e.g., in a country) should transmit the same content with the same bit rate at the same time and frequency, and the digital content should be bit-by-bit identical at each transmission site. Certain embodiments of TSRM systems may be applied in such a way to realize bit-by-bit identity while reducing bandwidth consumption when compared to traditional systems for these types of applications. For instance, the DTH content may be received at the DVB-T transmitter sites, and the content re-multiplexed using helper TSs to create the new transport streams to be used for the DVB-T network.

As another example, an application for the environment described in FIG. 1 may involve the distribution over satellite of a combination of regional and national services to be used in different DVB-T SFN cells. In such instances, each single frequency cell covers one region in a country. Regional content should be distributed over all transmitter sites in the region (one SFN cell), while the national content should be distributed nationwide, through all transmission sites in the country (e.g., transmitted to all of the SFN cells). In contrast to existing approaches to such applications, certain embodiments of the TSRM systems may be employed at the remote sites to reduce satellite bandwidth. For instance, the regional feeds can be multiplexed with the national feeds in a deterministic way, making sure all content is bit-by-bit identical at all transmission sites belonging to the same SFN-cell or region. As such, the national feeds only need to be transmitted once over the satellite link.

It should be emphasized that the above-described embodiments of the present disclosure are merely possible examples of implementations, merely set forth for a clear understanding of the principles of the TSRM systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method, comprising:
receiving a helper transport stream at a first and second re-multiplexers, the helper transport stream re-multiplexing a first indexed transport stream at the first and second re-multiplexers based on information received in the helper transport stream, wherein re-multiplexing comprises both inserting packets and program clock reference (PCR) re-stamping;
identically re-multiplexing the first indexed transport stream based on the helper transport stream and a description of the re-multiplexing;
generating by one of the first and second re-multiplexers a second transport stream, and
generating by another of the first and second re-multiplexers a third transport stream, respectively, the second transport stream identical to the third transport stream and different than the indexed transport stream.

2. The method of claim 1, wherein re-multiplexing comprises selecting packets of the first indexed transport stream for inclusion in the second transport stream and the third transport stream.

3. The method of claim 1, wherein receiving the first indexed transport stream comprises receiving an indexed multi program transport stream.

4. The method of claim 1, wherein re-multiplexing further comprises inserting packets, wherein inserting packets comprises inserting null packets, PSI packets, SI packets, PSIP packets, other packets, or a combination of two or more of the null packets, the PSI packets, the SI packets, the PSIP packets, and the other packets.

5. The method of claim 1, wherein re-multiplexing comprises separating the helper transport stream from the first indexed transport stream.

6. The method of claim 1, further comprising receiving at the first and second re-multiplexers one or more additional indexed transport streams, wherein re-multiplexing comprises separating the helper transport stream from the one or more additional indexed transport streams.

7. The method of claim 1, wherein receiving the helper transport stream comprises receiving the information in a fourth transport stream separate from the first indexed transport stream.

8. The method of claim 1, wherein the information comprises a set of operations associated with a previous re-multiplexing operation.

9. The method of claim 1, wherein re-multiplexing comprises applying a set of operations to the first indexed transport stream.

10. The method of claim 1, wherein re-multiplexing and generating comprises clocking with a common clock source the first indexed transport stream, the second transport stream, and the third transport streams.

11. A method, comprising:
receiving at a master re-multiplexer an indexed transport stream;
re-multiplexing the indexed transport stream, wherein the re-multiplexing comprises both program clock reference (PCR) re-stamping and inserting packets;

generating a helper transport stream, the helper transport stream comprising a description of the re-multiplexing; and providing the helper transport stream over a communications network to plural remote re-multiplexers configured to:

identically re-multiplex the indexed transport stream based on the helper transport stream and the description;

generate by one of the remote re-multiplexers a second transport stream, and generate by another of the remote re-multiplexers a third transport stream, respectively, the second transport stream identical to the third transport stream and different than the indexed transport stream.

12. The method of claim 11, further comprising providing the indexed transport stream over the communications network to the plural remote re-multiplexers contemporaneously with the provision of the helper transport stream.

13. The method of claim 11, further comprising receiving one or more additional indexed transport streams, and further comprising generating an additional helper transport stream for each new re-multiplexed transport stream.

14. The method of claim 11, wherein an index value for each packet of the indexed transport stream comprises a unique address for a defined time window or packet count for the each packet separate from a PID value.

15. The method of claim 11, wherein re-multiplexing and generating is based on a clock reference common to the master re-multiplexer and the plural remote re-multiplexers.

16. The method of claim 11, wherein providing comprises providing the helper transport stream in a multiplex with the indexed transport stream.

17. A system, comprising:

a master re-multiplexer configured to:

receive an indexed transport stream, re-multiplex the indexed transport stream by performing a set of re-multiplexing operations, generate a helper transport stream, the helper transport stream comprising a description of the set of re-multiplexing operations, wherein the set of re-multiplexing operations comprises both program clock reference (PCR) re-stamping and inserting packets, and provide the helper transport stream over a communications network to plural remote re-multiplexers located at separate locations configured to:

identically re-multiplex the indexed transport stream based on the helper transport stream and the description, generate by one of the remote re-multiplexers a second transport stream, and generate by another of the remote re-multiplexers a third transport stream, respectively, the second transport stream identical to the third transport stream and different than the indexed transport stream.

* * * * *